April 23, 1935. G. L. SHERWOOD 1,999,114
COMPOSITE METAL STRIP AND METHOD OF MAKING SAME
Filed April 14, 1933
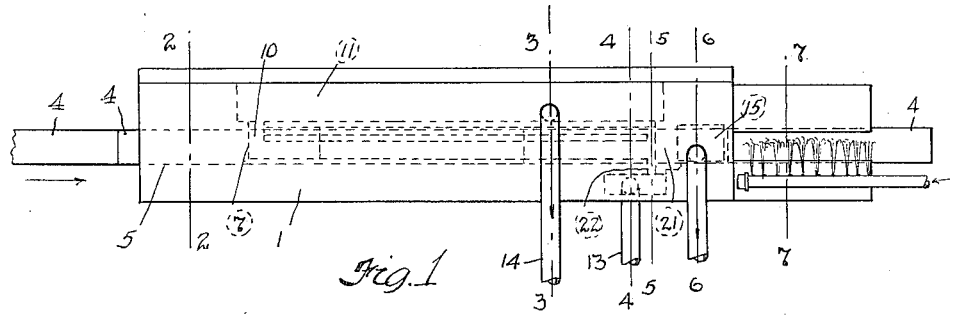
Fig. 1
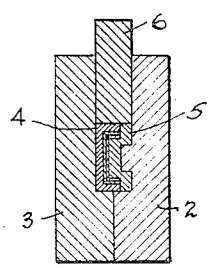 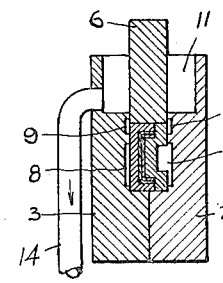 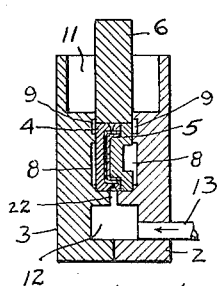 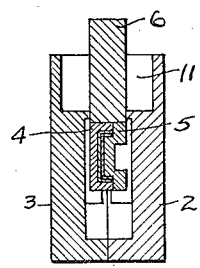
Fig. 2. Fig. 3. Fig. 4. Fig. 5.
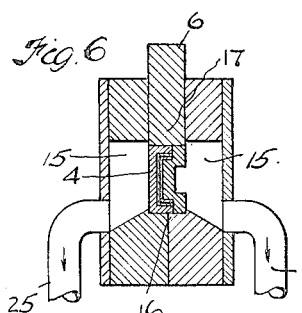 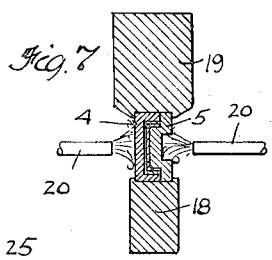 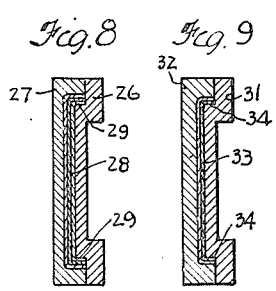 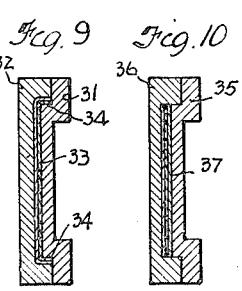
Fig. 6 Fig. 7 Fig. 8 Fig. 9 Fig. 10
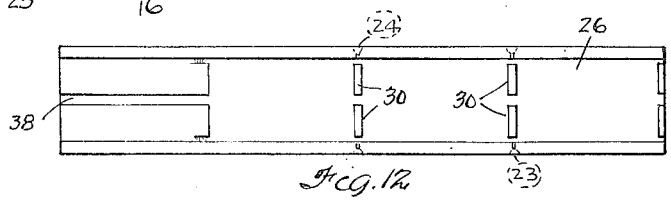 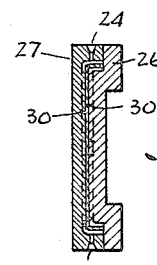
Fig. 12. Fig. 11.
Fig. 13.
INVENTOR.
Glenn L. Sherwood
BY
Fay, Oberlin & Fay
ATTORNEYS.

Patented Apr. 23, 1935

1,999,114

UNITED STATES PATENT OFFICE 1,999,114

COMPOSITE METAL STRIP AND METHOD OF MAKING SAME

Glenn L. Sherwood, Cleveland, Ohio, assignor to The Cleveland Graphite Bronze Company, Cleveland, Ohio, a corporation of Ohio Application April 14, 1933, Serial No. 666,133

10 Claims. (Cl. 22—204)

This invention relates as indicated to composite metallic strips and methods of and apparatus for making the same and relates particularly to the manufacture of bearings wherein a layer of bearing metal is applied by casting to one or more faces of a backing member formed of some tougher and stronger material such as steel.

The principles of my invention are particularly applicable to the manufacture of bearings employing as a backing member a steel body which is of such thickness that it cannot be readily coiled, especially after the application thereto of the bearing metal, so that it is desirable and advantageous to cast the bearing metal on the backing member while the composite strip is in flat form, it being understood that the cast flat composite strips may then be cut into sections of suitable lengths to be pressed or similarly formed into cylindrical or semi-cylindrical form.

The principles of my invention are particularly applicable to the manufacture of composite bearing elements in which a surface layer of bearing metal is cast on the opposite faces of a flat metal strip to provide a two-faced bearing element.

It is among the objects of my invention to provide methods of and apparatus for applying bearing metal to bearing elements of the above defined character.

Other objects of my invention will appear as the description proceeds.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing:—

Figure 1 is a front elevational view of one form of the apparatus comprising my invention capable of carrying out the process of my invention in the manufacture of a bearing element according to my invention; Figures 2, 3, 4, 5, 6, and 7 are respectively transverse, sectional views of the apparatus illustrated in Figure 1 taken on the planes indicated by the lines 2—2, 3—3, 4—4, 5—5, 6—6 and 7—7; Figure 8 is a transverse, sectional view of a permanent mold adapted to be employed in conjunction with the apparatus illustrated in the previous figures and being particularly adapted for use in the manufacture of flanged bearing elements having layers of bearing metal applied to the opposite faces of the backing member; Figure 9 is a transverse sectional view of a permanent mold adapted for use in the manufacture of flanged bearing members having bearing metal applied to only one face of the backing member; Figure 10 is a transverse sectional view of a permanent mold particularly adapted for use in the manufacture of flat metallic elements having bearing metal applied to the opposite faces of the flat backing strip; Figure 11 is a transverse, sectional view of a permanent mold such as is illustrated more particularly in Figure 8 and showing the provision and location of the vent openings in the mold; and Figures 12 and 13 are respectively elevational views of the matrix faces of the complementary sections forming a permanent mold such as illustrated in Figures 8 and 11.

The bearing element comprising my invention, as will be apparent from the ensuing description of its manufacture, consists of either a flanged or flat metallic strip of some suitable strong and tough material, such as steel, to one or more of the sides of which is applied a surface layer of bearing metal. The metallic strip forming the base of the bearing element is preliminarily prepared to receive the layer of bearing metal by being pickled or etched and thoroughly chemically cleaned with a suitable acid and after being washed is coated with a suitable flux and then coated with a bonding material such as tin. The process of making the bearing elements according to my invention, it is believed may best be understood by having reference to the apparatus illustrated for the purpose of carrying out such process.

Referring now, therefore, to Figure 1, it will be noted that the apparatus comprising my invention consists of a body 1 of heat resistant material and consists of complementary elements 2 and 3 supported in face-to-face relation by any suitable means not shown. The body 1 is provided with a longitudinally extending passage therethrough, through which will be moved in succession by any suitable means not shown, a plurality of permanent molds 4, the form of which will be hereinafter more fully explained. The area 5 of the passage through the body 1 adjacent the mold-receiving end of such passage is, as clearly illustrated in Figure 2, substantially rectangular to accommodate in close fitting engagement the mold 4. In order to compensate for slight irregularities in the dimensions of the molds 4, the cavity 5 is closed at the top in the body 1 by means of a longitudinally extending member 6, which rests upon the molds in their passage through the body. The member 6 is removable from the body 1 to facilitate cleaning the passage between successive runs of the apparatus.

Extending from the section line generally indicated at 5—5 to the left to a line generally indicated at 2—2, the lateral faces of the members 2 and 3 forming the cavity 5 are provided with longitudinally extending grooves 8 and 9. These grooves, at their left end, communicate with the vertical passage generally indicated at 10, which, at its upper end, is in communication with a recess 11 which extends longitudinally of the apparatus throughout a portion of its length. Underlying the passage 5 in the area of the section lines 4—4 and 5—5 is a cavity 12 having an inlet conduit 13 associated therewith. The cavity 11 has a drainage conduit 14 associated therewith.

In the area of the section line 6—6, as illustrated in Figure 6, the lateral walls of the body 1 are relieved an appreciable amount to provide substantial cavities 15 on opposite sides of the permanent mold 4. In this area, the mold is supported substantially entirely on its edges by the grooved ridge 16 and the lower portion 17 of the member 6. In the area of the section line 7—7, as illustrated in Figure 7, the mold is entirely supported on its edges by the grooved runways 18 and 19 and on opposite sides thereof are positioned spray conduits 20 adapted to project a cooling means such as water against the opposite faces of the mold 4 in order to chill and set the composite metallic strip contained therein prior to its withdrawal.

The operation of the above described apparatus is briefly as follows:—

The permanent molds 4 are introduced to and moved through the passage 5 in the body 1 by any suitable means such as a hydraulic ram or the like. Molten bearing metal is introduced to the apparatus through the conduit 13. The molten metal from the conduit 13 flows from the cavity 12 upwardly through the orifice 22 and against the lower edge of the molds. In the space 21 to the right of the orifice 22 the passage 5 is of substantially the same size as the molds passing therethrough so that the molten metal from the orifice 22 is forced to flow to the left through the grooves 8 and 9 in counterflow relation to the molds to be ultimately discharged through the passage 10 into the cavity 11 to be drawn off and returned to the reservoir by means of the conduit 14. Passing the molten metal through the passages 8 and 9 in counterflow relation to the direction of movement of the molds 4 effectively heats such molds in a very efficient manner. The bearing metal is prevented from flowing out of the left end of the passage 5 along the sides of the mold due to the molds being cold and, therefore, chilling the metal sufficiently to form a dam so that the circulating molten metal passes upwardly through the passage 10 into the cavity 11 and returns to the reservoir through the conduit 14.

In their passage through the heating zone, it will be noted that the lower edges of the molds have been substantially sealed by the lower surfaces of the molds riding on the bottom of the groove. After the molds have been heated, however, they pass over the aperture 22 from which the molten bearing metal flows into the mold cavities through the bottom vent holes 23. The metal is permitted to rise in the molds due to the air from the space therein being vented at the top of the molds through the openings 24. After the molds have been filled with the molten metal they proceed on to the supporting guide 16, as most clearly illustrated in Figure 6, at which point all excess metal in or adhering to the molds runs off into the cavities 15 to be returned therefrom through the conduits 25 to the reservoir. The filled mold is then moved to a position opposite the spray conduits 20 where a cooling medium such as water is projected against the opposite faces thereof to chill the mold and set the metal therein. After the metal has been set by chilling, the cast strips contained in the mold may be withdrawn therefrom in the usual manner by separating the sections of the mold.

The form of the permanent molds which may be employed in the apparatus just described and in carrying out the principles of my invention are illustrated in Figures 8 and 13, both inclusive. In Figure 8, the mold consists of two complementary sections 26 and 27 having matrix faces forming the cavity especially adapted to contain a backing strip 28 of some suitable material such as steel and which is provided along its opposite edges with laterally extending flanges 29 which seat on the contiguous faces of the section 26. At spaced points on the contiguous faces of the mold sections 26 and 27 are, as most clearly illustrated in Figures 12 and 13, projections 30 which extend inwardly, as most clearly illustrated in Figure 11, to substantially abut the opposite faces of the body member 28. These projections 30 are longitudinally spaced for such a distance as to substantially define areas which are substantially equivalent to the area of a finished bearing formed by cutting up into sections the strip produced in one of the molds.

In Figure 9 is shown a permanent mold consisting of sections 31 and 32 provided with matrix faces defining a mold cavity especially adapted to receive a flanged backing member 33. The recesses for the flanges 34 of the backing member are of a depth so that the right-hand face of the backing member lies in contact with the wall of the mold cavity so that bearing metal will be applied to only one face of the backing member.

In Figure 10 the permanent mold consisting of the complementary members 35 and 36 are especially adapted to receive a flat backing strip 37 which is held in a central position in the cavity of the mold by projections such as 30 on the opposite walls of the mold cavity.

As most clearly illustrated in Figures 12 and 13, the permanent mold sections may be provided with cavities which extend to within only a substantial distance from one end of the molds. This expedient is adopted so as to provide a substantial heat dam between longitudinally contiguous molds as they pass from the draining chamber to the chilling region in the apparatus, so that the metal within the molds due to conduction within the walls thereof will not be chilled back into the draining and filling chambers but will be kept molten until the molds pass into the chilling area.

As above indicated, the mold cavity which receives the backing strip and in which the composite strip is formed extends to within only a substantial distance from one end of the molds. This space not occupied by the mold cavity as illustrated at the left in Figures 12 and 13 is, however, provided with a longitudinally extending passage which opens out of the end of the mold.

When a plurality of molds in end-to-end relation are passing from the filling and draining areas to the chilling areas, the passages 38, therefore, provide communication between the mold cavity which is being chilled and the molds which are still in the heated condition. This communication is important for the reason that as the forward mold is chilled the metal therein shrinks and as such shrinkage takes place, the mold being chilled is kept filled by bearing metal flowing forward through the passage 38 from the molds which are still in a heated condition and in which the bearing metal is still in liquid form. It will, therefore, be seen that even though the bearing metal does shrink during the chilling thereof, sufficient additional metal will be fed forward into the mold being chilled so that the finished strip will be full in form and not have reduced areas effected by shrinkage of the metal.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:—

1. The method of making a composite metallic strip, which comprises supporting a strip of metal in the cavity of a permanent mold, heating such mold by moving the same in direct contact with and in counterflow relation to a stream of molten metal, filling out the cavity of the heated mold with molten metal, chilling the filled mold and then removing the formed composite metallic strip therefrom.

2. The method of making a composite metallic strip, which comprises supporting a strip of metal in the cavity of a permanent mold, heating such mold by moving the same in direct contact with and in counterflow relation to a stream of molten metal, filling out the cavity of the heated mold with molten metal, draining from such filled mold the excess of molten metal therein and adhering thereto, chilling the filled mold and then removing the formed composite metallic strip therefrom.

3. The method of making a composite metallic strip, which comprises supporting a strip of metal in the cavity of a permanent mold provided with vents extending from such cavity through the top and bottom of the mold, passing such mold through a bath of molten metal having contact with the lateral surfaces thereof to heat the same, passing such heated mold through a chamber which contains a bath of molten metal having access to the lower edge of the mold to fill the cavity thereof through at least some of said vents, and chilling the filled mold prior to its removal from said chamber.

4. The method of making a composite metal strip, which comprises supporting a strip of metal in spaced relation to the opposite walls of the cavity in a permanent mold, heating such mold, passing such heated mold through a chamber containing a bath of molten metal to fill the space in said mold cavity on opposite sides of said strip with molten metal, and chilling said mold, to solidify such metal before removing the mold from said chamber.

5. The method of making composite metal strips, which comprises respectively supporting strips of metal in spaced relation to the opposite walls of the cavities in a corresponding number of permanent molds, successively passing such molds through a chamber containing a heating zone, a bath of molten metal to fill out said mold cavities, and a cooling zone to set the molten metal in said cavities prior to withdrawal of said molds from said chamber.

6. The method of making composite bearing metal elements, which comprises supporting a strip of metal in spaced relation to both lateral walls of the cavity in a permanent mold, passing such mold through a chamber containing bath of molten bearing metal to heat the same, filling out the cavity of such heated mold with molten bearing metal, and chilling the filled mold prior to withdrawal from said chamber.

7. In apparatus for casting composite metallic bearing members, the combination of an elongated heat resistant body provided with a longitudinally extending laterally substantially enclosed passage, a plurality of permanent molds adapted to be moved in succession through said passage, means for circulating a stream of molten metal through a portion of said passage and in direct contact with said molds, means for feeding molten metal into the heated molds, and means for chilling said heated molds before discharging the same from said passage.

8. In apparatus for casting composite metallic bearing members, the combination of an elongated heat-resistant body provided with a longitudinally extending laterally substantially enclosed passage, a plurality of permanent molds adapted to be moved in succession through said passage, means for introducing a screen of molten metal into said passage and into direct contact with said molds, means for feeding molten metal into said molds and means for chilling said molds to solidify the metal therein before discharging such molds from said passage.

9. A permanent mold for use in casting composite metallic strips adapted to be cut into sections and formed into bearings, comprising separable complementary portions defining a longitudinal cavity, said portions being provided with longitudinally spaced projections adapted to engage a metal strip positioned in said cavity and extending into said cavity at opposite points, said points being longitudinally spaced for a distance equivalent to the length of the bearing sections to be cut from such strips.

10. The method of making composite metal strips, which comprises respectively supporting strips of metal in the cavities of a corresponding number of permanent molds, successively passing such molds through a heating zone, a bath of molten metal to fill out said mold cavities and a cooling zone to set the molten metal, and feeding molten metal through a mold in the heated zone into a mold in the cooling zone to make up for shrinkage of the metal in the mold being cooled.

GLENN L. SHERWOOD.